(12) United States Patent
Bruijns

(10) Patent No.: US 7,027,630 B2
(45) Date of Patent: Apr. 11, 2006

(54) METHOD OF ANALYZING A DATA SET COMPRISING A VOLUMETRIC REPRESENTATION OF AN OBJECT TO BE EXAMINED

(75) Inventor: Johannes Bruijns, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 674 days.

(21) Appl. No.: 10/024,759

(22) Filed: Dec. 19, 2001

(65) Prior Publication Data

US 2002/0114510 A1    Aug. 22, 2002

(30) Foreign Application Priority Data

Dec. 22, 2000  (EP) .................................. 00204788

(51) Int. Cl.
*G06K 9/00* (2006.01)
(52) U.S. Cl. .................. 382/131; 382/154; 378/28; 600/425
(58) Field of Classification Search ........ 382/128–133, 382/154, 168, 172, 181, 194, 203, 237, 254, 382/274, 276, 285, 305, 316, 188, 189, 275, 382/202; 600/443, 437, 425, 420; 378/98.12, 378/50, 8, 21, 28; 250/453.11; 348/470
See application file for complete search history.

(56) References Cited

U.S. PATENT DOCUMENTS

| | | | |
|---|---|---|---|
| 5,590,654 A * | 1/1997 | Prince ........................ 600/420 |
| 6,132,376 A * | 10/2000 | Hossack et al. ............ 600/443 |
| 6,309,353 B1 * | 10/2001 | Cheng et al. ............... 600/437 |
| 6,351,513 B1 * | 2/2002 | Bani-Hashemi et al. ........ 378/8 |
| 6,366,800 B1 * | 4/2002 | Vining et al. ............... 600/425 |
| 6,389,104 B1 * | 5/2002 | Bani-Hashemi et al. . 378/98.12 |
| 6,674,894 B1 * | 1/2004 | Parker et al. ............... 382/154 |
| 6,690,816 B1 * | 2/2004 | Aylward et al. ............ 382/128 |

* cited by examiner

*Primary Examiner*—Sanjiv Shah
*Assistant Examiner*—Seyed Azarian

(57) ABSTRACT

Method of analyzing a data set of an object to be examined, which data set includes voxels of at least a first type and a second type, and a computer program for carrying out the method. The method includes the steps of classifying the voxels as voxels of the first, the second or further types, thereafter determining which of the voxels of the first type are boundary voxels that adjoin voxels of the second or further types, thereafter assigning a data value to each voxel of the first type, the data value representing a measure of the distance between the voxel and the neatest boundary voxel., and thereafter classifying the voxels of the first type that have a distance data valve exceeding a predetermined threshold as aberration voxels indicative of an aberration in the object.

19 Claims, 2 Drawing Sheets

Figure 1:
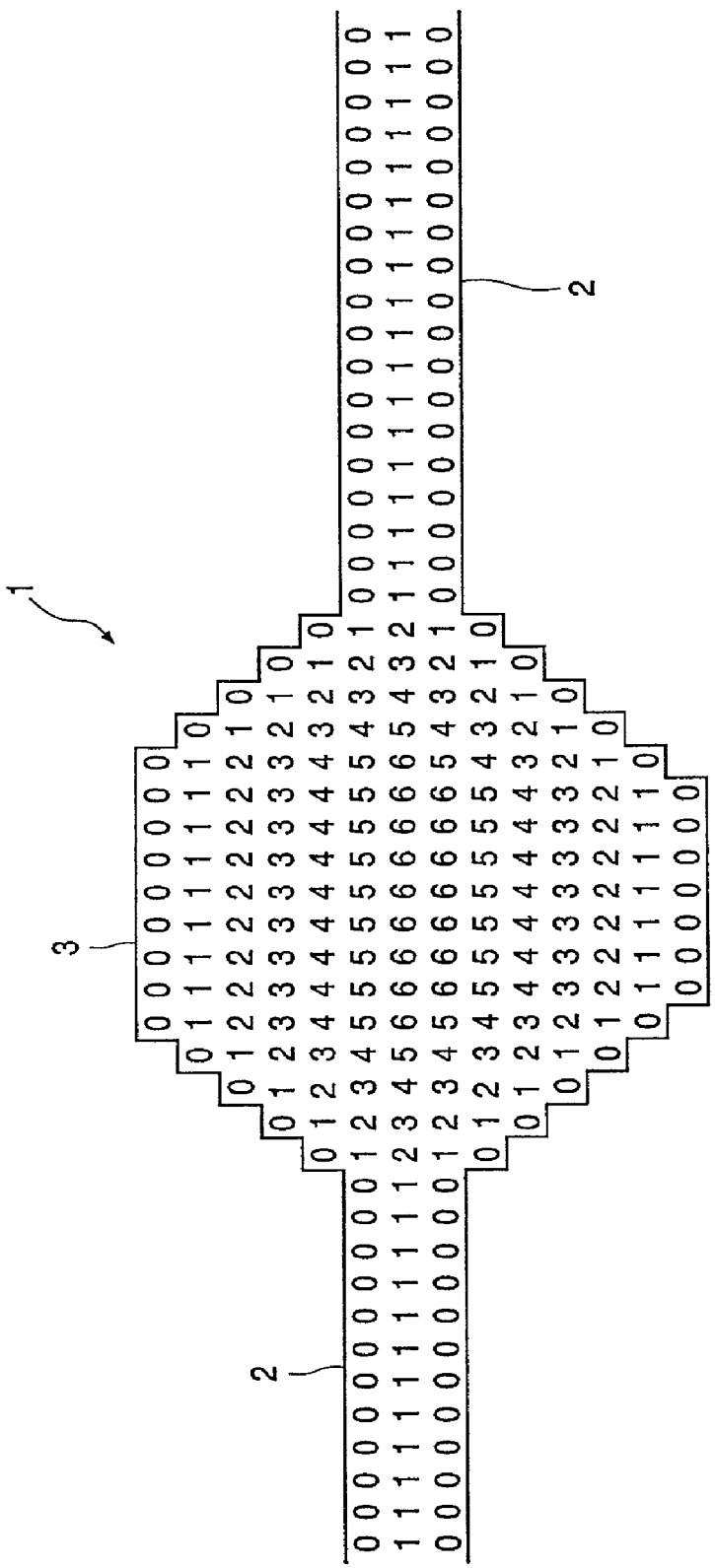

METHOD OF ANALYZING A DATA SET COMPRISING A VOLUMETRIC REPRESENTATION OF AN OBJECT TO BE EXAMINED

The present invention relates to a method of analyzing a data set of an object to be examined, which data set comprises voxels of at least a first type and a second type.

Such a volumetric representation of the object can be acquired by means of various techniques. Some examples thereof are: 3D X-ray rotational angiography, computed tomography, magnetic resonance imaging or magnetic resonance angiography. The object typically represents a patient to be examined.

The international patent application EP00/09505 (PHN 17.678) of the same applicant (not yet published) relates to a method of the type mentioned above. This method concerns the determination of the volume of an aneurysm in a blood vessel. According to the method described in the cited international patent application EP00/09505, a self-adjusting probe is defined for analysis of the data set. Doing so requires a lot of expert interaction, and is a burden since the analysis is often performed real-time during vascular surgery.

It is an object of the invention to provide a method of the type described above which requires less expert interaction.

To this end, the method according to the invention comprises the following steps:
a) classifying the voxels as voxels of the first, the second or further types;
b) determining which of the voxels of the first type are boundary voxels that adjoin voxels of the second or further types;
c) assigning a data value to each voxel of the first type, said data value representing a measure of the distance between said voxel and the nearest boundary voxel;
d) classifying the voxels of the first type that have a distance data value exceeding a predetermined threshold as aberration voxels.

The method according to the invention allows for quick semi-automatic determination of the voxels defining the aberration.

A preferred version of the method also comprises the following steps:
e) determining which of the aberration voxels are boundary aberration voxels adjoining voxels of the first type;
f) adding a number of voxels of the first type that form a shell of a certain thickness to the aberration voxels.

The number of voxels defining the aberration can now be determined with a greater accuracy.

Preferably the step f comprises the steps of:
f1. assigning a data value to each voxel of the first type, said data value representing a measure of the distance between said voxel and the nearest boundary aberration voxel;
f2. classifying the voxels of the first type that have a distance data value less than or equal to a predetermined ceiling value as aberration voxels.

In one version the volume of the aberration is computed by determining the sum of all aberration voxels and multiplying the sum of the aberration voxels by the volume of a single voxel.

In an elegant version of the method according to the invention said distance data values are computed by means of a distance transform function.

It is to be noted that the distance transform function is known per se in a field other than that of the present invention, that is the field of computer vision where the distance transform function is used for object recognition based on pictures. The distance transform function is described, for example, in the paper "Distance transformations in arbitrary dimensions" by G. Borgefors, Computer Vision, Graphics and Image Processing, Vol. 27, pages 321–345, 1984.

The threshold and/or ceiling value can be set by the user. In order to reduce the necessary expert interaction even further, the threshold and/or ceiling value can alternatively be computed on the basis of a histogram of distance data values.

To further enhance the accuracy of the computation of the volume of the aberration, another version of the method according to the invention comprises the steps of:
defining a tubular structure of voxels of the first type piercing through the aberration; determining the number of voxels of the tubular structure and subtracting said number from the number of aberration voxels.

Preferably, the method also comprises the steps of:
a. classifying all boundary aberration voxels as potential tubular structure voxels;
b. selecting a starting point from among the potential tubular structure voxels;
c. selecting an end point from among the potential tubular structure voxels; and
d. connecting the starting point to the end point, thus defining the tubular structure.

The invention also relates to a computer program for carrying out the method according to the invention.

Figure 2:
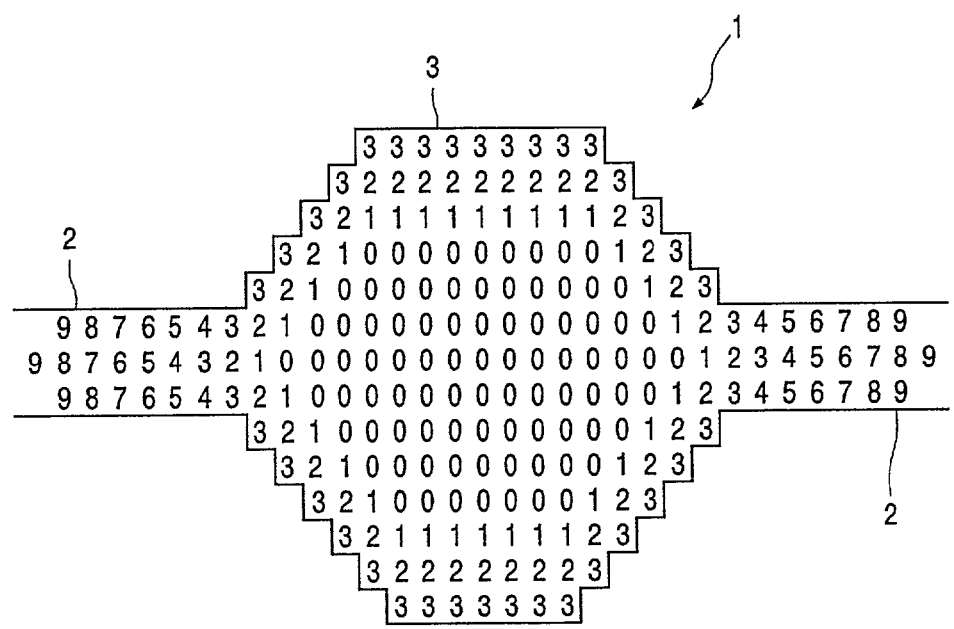

The invention will be described in detail hereinafter with reference to the attached drawings, in which:

FIG. 1 shows schematically a volumetric representation of an object to be examined after application of a first version of the method according tot the invention, and FIG. 2 shows the volumetric representation of FIG. 1 after application of a second version of the method according tot the invention.

FIG. 1 shows an example of a possible result of application of the present invention to an object to be examined. In this case the object is part of the vascular system of a patient. Using of well-known techniques the object is recorded and represented by means of a data set comprising volume elements (voxels). An example of such a technique is described, for example, in the article "3D rotational angiography: Clinical value in endovascular treatment", by Moret et al., published in Medicamundi, Vol. 42, Issue 3, November 1998. In the present example there are generally two kinds of voxels, that is, voxels of the first type, which in this case are vessel voxels, and voxels of the second type, which in this case are tissue voxels (not shown).

FIG. 1 shows schematically the object 1 which comprises blood vessels 2 that connect with an aneurysm 3, being is an aberration of the vessel acting as a reservoir.

Application of the method according to the invention allows for determination of the volume of the aneurysm, this is essential for successful and safe medical treatment thereof.

In a first step vessel voxels are classified as voxels of the first type and tissue voxels are classified as voxels of the second type. This operation can be performed by means of known techniques, such as a 'region growing algorithm'.

In a next step it is determined which of the vessel voxels adjoin tissue voxels. These voxels are referred to as boundary vessel voxels. Preferably, this determination is performed by finding the facing neighbors, that is neighbors which have one voxel face in common.

Subsequently a data value representing a measure of the distance between the relevant vessel voxel and the nearest boundary vessel voxel is assigned to each vessel voxel. According to the invention said distance data values are computed by means of a distance transform function.

According to this distance transform function, the distance data values of the boundary vessel voxels are set at a low distance data value, for example, zero. The distance data values for all other voxels are initially set at a high distance data value, for example, 127. The distance transform function then computes distance data values for each voxel. An elegant way of computing the distance data value is as follows: the distance data value for a specific voxel is defined as the minimum of the distance data value of each of the neighbors of that specific voxel plus a number, for example, one. Preferably, the distance transform function is computed once for all voxels in a certain order. Next, the distance transform is again computed for all voxels, but now in the reverse order. In order to simplify and hence shorten the computation, preferably only vessel 4 voxels are involved in the computation. An example of the result of this computation is shown in FIG. 1.

All vessel voxels with a distance data value exceeding a predetermined threshold are then classified as aberration voxels. The user can set this threshold interactively. Preferably the threshold should be chosen to be slightly greater than the radii of the connected vessels 2. As an alternative the threshold can be computed automatically, for example, on the basis of a histogram of distance data values. In this example let it be assumed that the threshold is three. All vessel voxels with a distance data value equal to or larger than three are then classified as aberration voxels. In the present example the aberration voxels are aneurysm voxels and a first estimate for the number of aneurysm voxels is now available.

In order to compute the number of aneurysm voxels more precisely the next steps are performed.

These steps mainly mean that a new distance data value is computed for a select number of voxels to make sure that all boundary aberration voxels are also included. Again the distance transform function can be used for this purpose. For useful techniques and remarks on performing these steps we refer to those mentioned above.

First it is determined which of the aberration voxels are boundary aberration voxels adjoining vessel voxels.

Next a data value representing a measure of the distance between the reference vessel voxel and the nearest boundary aberration voxel is assigned to each vessel voxel. The result of this computation is shown in FIG. 2.

All vessel voxels with a distance data value less than or equal to a predetermined ceiling value are now classified as aberration voxels. Preferably, the ceiling value is equal to or slightly greater (e.g. by one unit) than the threshold. In this case the ceiling value is equal to the threshold, that is, three. As can be seen when comparing FIG. 1 and FIG. 2 the second computation results in a more accurate determination of the number of aneurysm voxels.

Now that the aneurysm voxels are known they can simply be summed and multiplied by the volume of a single voxel so as to determine the volume of the aneurysm 3.

In the specific case of determining the volume of an aneurysm those voxels that represent part of the vessel which is needed for an unrestricted blood flow between the vessels 2 should preferably not be included. To account for these voxels a tubular structure of vessel voxels piercing the aneurysm is defined.

This can be performed by means of a method comprising the following steps. First all boundary aneurysm voxels are classified as potential tubular structure voxels. Out of the potential tubular structure voxels one voxel is selected as a starting point and one voxel is selected as an end point. To define the tubular structure the starting point and the end point are connected. This connection can be performed by means of known techniques, such as the so-called "self adjusting probes" mentioned above.

On the basis of the definition of the tubular structure the corresponding number of voxels can be determined and subtracted from the number of aneurysm voxels.

On the basis of the above explanation of the method of the invention a skilled person will be able to translate the steps of the method into a computer program for carrying out the method.

Summarizing the invention refers to a method for analyzing a data set comprising a volumetric representation of (a part of) an object to be examined in order to detect a sub-object of a volume greater than the volume of surrounding sub objects and to measure the volume of said sub object. This method is especially useful in the field of medical diagnostics and treatment where the object notably is a patient to be examined.

The invention is, of course not limited to the versions described or shown, but generally extends to any version that is, which falls within the scope of the appended claims as seen in the light of the foregoing description and drawings.

The invention claimed is:

1. A method for analyzing a data set of an object to be examined, which data set comprises voxels of at least a first type and a secondtype, said method comprising the steps of:
    classifying the voxels as voxels of the first, the second or further types; thereafter
    determining which of the voxels of the first type are boundary voxels that adjoin voxels of the second or further types; thereafter
    assigning a data value to each voxel of the first type, said data value representing a measure of the distance between said voxel and the nearest boundary voxel; thereafter
    classifying the voxels of the first type that have a distance data value exceeding a predetermined threshold as aberration voxels indicative of an aberration in the object; thereafter
    determining which of the aberration voxels are boundary abberration voxels adjoining non-aberration voxels of the first type; and thereafter
    adding a number of voxels of the first type that form a shell of a certain thickness to the aberration voxels.

2. The method as defined by claim 1, wherein the step of adding a number of voxels of the first type that form a shell of a certain thickness to the aberration voxels comprises the steps of:
    assigning a data value to each voxel of the first type, said data value representing a measure of the distance between said voxel and the nearest boundary aberration voxel; and thereafter
    classifying the voxels of the first type that have a distance data value less than or equal to a predetermined ceiling value as aberration voxels.

3. The method as defined by claim 1, further comprising the steps of:
    determining the sum of all aberration voxels; and multiplying the sum of the aberration voxels by the volume of a single voxel so as to determine the volume of the aberration.

4. The method as defined by claim 1, wherein said distance data values are computed by means of a distance transform function.

5. The method as defined by claim 1, wherein said predetermined threshold is set by a user.

6. The method as defined by claim 1, wherein said predetermined threshold is computed on the basis of a histogram of distance data values.

7. The method as defined by claim 1, further comprising the steps of:
defining a tubular structure of voxels of the first type piercing through the aberration;
determining the number of voxels of the tubular structure; and
subtracting said number of voxels of the tubular structure from the number of aberration voxels.

8. The method as defined by claim 7, further comprising the steps of:
determining which of the aberration voxels are boundary abberration voxels adjoining non-aberration voxels of the first type;
classifying all boundary aberration voxels as potential tubular structure voxels;
selecting a starting point from among the potential tubular structure voxels;
selecting an end point from among the potential tubular structure voxels; and
connecting the starting point to the end point thus defining the tubular structure.

9. A computer program for carrying out the method as defined by claim 1.

10. The method as defined by claim 2, wherein said predetermined ceiling value is set by a user.

11. The method as claimed defined by claim 2, wherein said predetermined threshold and said predetermined ceiling value are set by a user.

12. The method as defined by claim 2, wherein said predetermined ceiling value is computed on the basis of a histogram of distance data values.

13. The method as defined by claim 1, wherein said predetermined threshold and said predetermined ceiling value are computed on the basis of a histogram of distance data values.

14. The method as defined by claim 1, wherein the object is a blood vessel and the aberration is an aneurysm.

15. A method for delineating an aneurysm in a blood vessel, comprising the steps of:
representing the blood vessel by means of a data set comprising voxels;
classifying the voxels as vessel voxels or tissue or other type voxels; thereafter
determining which of the vessel voxels are boundary vessel voxels that adjoin tissue or other type voxels; thereafter
assigning a data value to each vessel voxel, the data value representing a measure of the distance between the vessel voxel and the nearest boundary vessel voxel; thereafter
classifying the vessel voxels that have a distance data value exceeding a predetermined threshold as aberration voxels indicative of an aneurysm the blood vessel; thereafter
determining which of the aberration voxels are boundary aberration voxels adjoining non-aberration voxels of the first type; and thereafter
adding a number of voxels of the first type that form a shell of a certain thickness to the aberration voxels.

16. The method as defined by claim 15, further comprising the steps of:
determining which of the aberration voxels are boundary aberration voxels adjoining non-aberration vessel voxels; and
adding a number of vessel voxels that form a shell of a certain thickness to the aberration voxels.

17. The method as defined by claim 16, wherein the step of adding a number of vessel voxels that form a shell of a certain thickness to the aberration voxels comprises the steps of:
assigning a data value to each vessel voxel, said data value representing a measure of the distance between said vessel voxel and the nearest boundary aberration voxel; and thereafter
classifying the vessel voxels that have a distance data value less than or equal to a predetermined ceiling value as aberration voxels.

18. The method as defined by claim 15, further comprising the step of determining the volume of the aneurysm by determining the sum of all aberration voxels, and multiplying the sum of the aberration voxels by the volume of a single voxel.

19. The method as defined by claim 15, wherein the voxels are classified by means of a region growing algorithm.

* * * * *